(12) United States Patent
McQuaid

(10) Patent No.: US 12,153,697 B2
(45) Date of Patent: Nov. 26, 2024

(54) CONTROLLING JUST IN TIME ACCESS TO A CLUSTER

(71) Applicant: Salesforce, Inc., San Francisco, CA (US)

(72) Inventor: Stephen McQuaid, Indianapolis, IN (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/936,294

(22) Filed: Sep. 28, 2022

(65) Prior Publication Data

US 2023/0025159 A1 Jan. 26, 2023

Related U.S. Application Data

(63) Continuation of application No. 16/906,755, filed on Jun. 19, 2020, now Pat. No. 11,494,509.

(51) Int. Cl.
| | |
|---|---|
| *G06F 21/62* | (2013.01) |
| *G06F 9/455* | (2018.01) |
| *G06F 16/13* | (2019.01) |
| *G06F 21/10* | (2013.01) |

(52) U.S. Cl.
CPC ........ *G06F 21/6218* (2013.01); *G06F 9/4552* (2013.01); *G06F 16/13* (2019.01); *G06F 21/1076* (2023.08); *G06F 2221/2125* (2013.01); *G06F 2221/2141* (2013.01)

(58) Field of Classification Search
CPC .... G06F 21/6218; G06F 9/4552; G06F 16/13; G06F 21/1076; G06F 2221/2125; G06F 2221/2141; G06F 2009/45587; G06F 9/45558; G06F 21/62

See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose |
| 5,761,419 A | 6/1998 | Schwartz |
| 5,819,038 A | 10/1998 | Carleton |
| 5,821,937 A | 10/1998 | Tonelli |
| 5,831,610 A | 11/1998 | Tonelli |
| 5,873,096 A | 2/1999 | Lim |
| 5,918,159 A | 6/1999 | Fomukong |

(Continued)

OTHER PUBLICATIONS

Office Action (Non-Final Rejection) dated Jan. 6, 2022 for U.S. Appl. No. 16/906,755 (pp. 1-17).

(Continued)

*Primary Examiner* — Quazi Farooqui
(74) *Attorney, Agent, or Firm* — Kwan & Olynick LLP

(57) ABSTRACT

Examples include a system and computer-implemented method to receive a notification from an application programming interface (API) of creation of a just in time (JIT) grant, the JIT grant defining a request for a user to be authorized to access a cluster according to a JIT policy; determine if access to the cluster by the user is authorized according to the JIT policy; grant access to the user to the cluster when access is authorized according to the JIT policy; and send a notification to the API that access by the user to the cluster is granted.

17 Claims, 12 Drawing Sheets

(56) References Cited

U.S. PATENT DOCUMENTS

| | | | |
|---|---|---|---|
| 5,963,953 | A | 10/1999 | Cram |
| 6,092,083 | A | 7/2000 | Brodersen |
| 6,169,534 | B1 | 1/2001 | Raffel |
| 6,178,425 | B1 | 1/2001 | Brodersen |
| 6,189,011 | B1 | 2/2001 | Lim |
| 6,216,135 | B1 | 4/2001 | Brodersen |
| 6,233,617 | B1 | 5/2001 | Rothwein |
| 6,266,669 | B1 | 7/2001 | Brodersen |
| 6,295,530 | B1 | 9/2001 | Ritchie |
| 6,324,568 | B1 | 11/2001 | Diec |
| 6,324,693 | B1 | 11/2001 | Brodersen |
| 6,336,137 | B1 | 1/2002 | Lee |
| D454,139 | S | 3/2002 | Feldcamp |
| 6,367,077 | B1 | 4/2002 | Brodersen |
| 6,393,605 | B1 | 5/2002 | Loomans |
| 6,405,220 | B1 | 6/2002 | Brodersen |
| 6,434,550 | B1 | 8/2002 | Warner |
| 6,446,089 | B1 | 9/2002 | Brodersen |
| 6,535,909 | B1 | 3/2003 | Rust |
| 6,549,908 | B1 | 4/2003 | Loomans |
| 6,553,563 | B2 | 4/2003 | Ambrose |
| 6,560,461 | B1 | 5/2003 | Fomukong |
| 6,574,635 | B2 | 6/2003 | Stauber |
| 6,577,726 | B1 | 6/2003 | Huang |
| 6,601,087 | B1 | 7/2003 | Zhu |
| 6,604,117 | B2 | 8/2003 | Lim |
| 6,604,128 | B2 | 8/2003 | Diec |
| 6,609,150 | B2 | 8/2003 | Lee |
| 6,621,834 | B1 | 9/2003 | Scherpbier |
| 6,654,032 | B1 | 11/2003 | Zhu |
| 6,665,648 | B2 | 12/2003 | Brodersen |
| 6,665,655 | B1 | 12/2003 | Warner |
| 6,684,438 | B2 | 2/2004 | Brodersen |
| 6,711,565 | B1 | 3/2004 | Subramaniam |
| 6,724,399 | B1 | 4/2004 | Katchour |
| 6,728,702 | B1 | 4/2004 | Subramaniam |
| 6,728,960 | B1 | 4/2004 | Loomans |
| 6,732,095 | B1 | 5/2004 | Warshavsky |
| 6,732,100 | B1 | 5/2004 | Brodersen |
| 6,732,111 | B2 | 5/2004 | Brodersen |
| 6,754,681 | B2 | 6/2004 | Brodersen |
| 6,763,351 | B1 | 7/2004 | Subramaniam |
| 6,763,501 | B1 | 7/2004 | Zhu |
| 6,768,904 | B2 | 7/2004 | Kim |
| 6,782,383 | B2 | 8/2004 | Subramaniam |
| 6,804,330 | B1 | 10/2004 | Jones |
| 6,826,565 | B2 | 11/2004 | Ritchie |
| 6,826,582 | B1 | 11/2004 | Chatterjee |
| 6,826,745 | B2 | 11/2004 | Coker |
| 6,829,655 | B1 | 12/2004 | Huang |
| 6,842,748 | B1 | 1/2005 | Warner |
| 6,850,895 | B2 | 2/2005 | Brodersen |
| 6,850,949 | B2 | 2/2005 | Warner |
| 7,289,976 | B2 | 10/2007 | Kihneman |
| 7,340,411 | B2 | 3/2008 | Cook |
| 7,620,655 | B2 | 11/2009 | Larsson |
| 10,878,079 | B2 | 12/2020 | Vepa |
| 11,397,794 | B1 * | 7/2022 | Baghani .................. G06F 21/44 |
| 2001/0044791 | A1 | 11/2001 | Richter |
| 2002/0022986 | A1 | 2/2002 | Coker |
| 2002/0029161 | A1 | 3/2002 | Brodersen |
| 2002/0029376 | A1 | 3/2002 | Ambrose |
| 2002/0035577 | A1 | 3/2002 | Brodersen |
| 2002/0042264 | A1 | 4/2002 | Kim |
| 2002/0042843 | A1 | 4/2002 | Diec |
| 2002/0072951 | A1 | 6/2002 | Lee |
| 2002/0082892 | A1 | 6/2002 | Raffel |
| 2002/0129352 | A1 | 9/2002 | Brodersen |
| 2002/0140731 | A1 | 10/2002 | Subramaniam |
| 2002/0143997 | A1 | 10/2002 | Huang |
| 2002/0152102 | A1 | 10/2002 | Brodersen |
| 2002/0161734 | A1 | 10/2002 | Stauber |
| 2002/0162090 | A1 | 10/2002 | Parnell |
| 2002/0165742 | A1 | 11/2002 | Robins |
| 2003/0004971 | A1 | 1/2003 | Gong |
| 2003/0018705 | A1 | 1/2003 | Chen |
| 2003/0018830 | A1 | 1/2003 | Chen |
| 2003/0066031 | A1 | 4/2003 | Laane |
| 2003/0066032 | A1 | 4/2003 | Ramachandran |
| 2003/0069936 | A1 | 4/2003 | Warner |
| 2003/0070000 | A1 | 4/2003 | Coker |
| 2003/0070004 | A1 | 4/2003 | Mukundan |
| 2003/0070005 | A1 | 4/2003 | Mukundan |
| 2003/0074418 | A1 | 4/2003 | Coker |
| 2003/0088545 | A1 | 5/2003 | Subramaniam |
| 2003/0120675 | A1 | 6/2003 | Stauber |
| 2003/0151633 | A1 | 8/2003 | George |
| 2003/0159136 | A1 | 8/2003 | Huang |
| 2003/0187921 | A1 | 10/2003 | Diec |
| 2003/0189600 | A1 | 10/2003 | Gune |
| 2003/0191743 | A1 | 10/2003 | Brodersen |
| 2003/0204427 | A1 | 10/2003 | Gune |
| 2003/0206192 | A1 | 11/2003 | Chen |
| 2003/0225730 | A1 | 12/2003 | Warner |
| 2004/0001092 | A1 | 1/2004 | Rothwein |
| 2004/0010489 | A1 | 1/2004 | Rio |
| 2004/0015981 | A1 | 1/2004 | Coker |
| 2004/0027388 | A1 | 2/2004 | Berg |
| 2004/0128001 | A1 | 7/2004 | Levin |
| 2004/0186860 | A1 | 9/2004 | Lee |
| 2004/0193510 | A1 | 9/2004 | Catahan |
| 2004/0199489 | A1 | 10/2004 | Barnes-Leon |
| 2004/0199536 | A1 | 10/2004 | Barnes Leon |
| 2004/0199543 | A1 | 10/2004 | Braud |
| 2004/0249854 | A1 | 12/2004 | Barnes-Leon |
| 2004/0260534 | A1 | 12/2004 | Pak |
| 2004/0260659 | A1 | 12/2004 | Chan |
| 2004/0268299 | A1 | 12/2004 | Lei |
| 2005/0050555 | A1 | 3/2005 | Exley |
| 2005/0091098 | A1 | 4/2005 | Brodersen |
| 2007/0157292 | A1 | 7/2007 | Danner |
| 2009/0177744 | A1 | 7/2009 | Marlow |
| 2017/0185640 | A1 | 6/2017 | Janarthanam |
| 2020/0213320 | A1 | 7/2020 | Levin |
| 2020/0314109 | A1 * | 10/2020 | Subhash .............. G06F 21/6218 |

OTHER PUBLICATIONS

Office Action (Notice of Allowance and Fees Due (PTOL-85)) dated Jul. 21, 2022 for U.S. Appl. No. 16/906,755 (pp. 1-8).

* cited by examiner

_US 12,153,697 B2_

CONTROLLING JUST IN TIME ACCESS TO A CLUSTER

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

BACKGROUND

The field of invention relates to controlling access to computing resources, and, more specifically, to controlling just in time (JIT) access by a user to a cluster in a cloud computing environment.

Cloud computing services provide shared resources, software, and information to computers and other devices upon request or on demand. In cloud computing environments, software applications can be accessible over the Internet rather than installed locally on personal or in-house computer systems. Cloud computing typically involves the over-the-Internet provision of dynamically scalable and often virtualized resources. Technological details can be abstracted from end-users (e.g., client computing systems), who no longer have to develop expertise in, or control over, the technology infrastructure "in the cloud" that supports them. Some of the applications or on-demand services provided to clients can include the ability for a user to create, view, modify, store and share documents and other files.

With modern web services in a cloud computing environment, users expect applications to be available at all times, and developers expect to deploy new versions of those applications up to several times a day. Containerization helps package software to serve these goals, enabling applications to be released and updated in containers in an easy and fast way without downtime. Kubernetes (described on the Internet at kubernetes.io) is an open source system for automating deployment, scaling, and management of containerized applications. Kubernetes provides computing resources to containerized applications and helps containerized applications find necessary resources and tools in the cloud computing environment.

In some cases, controlling access to Kubernetes clusters provides needed security in the cloud computing environment.

DETAILED DESCRIPTION

Figure 1:
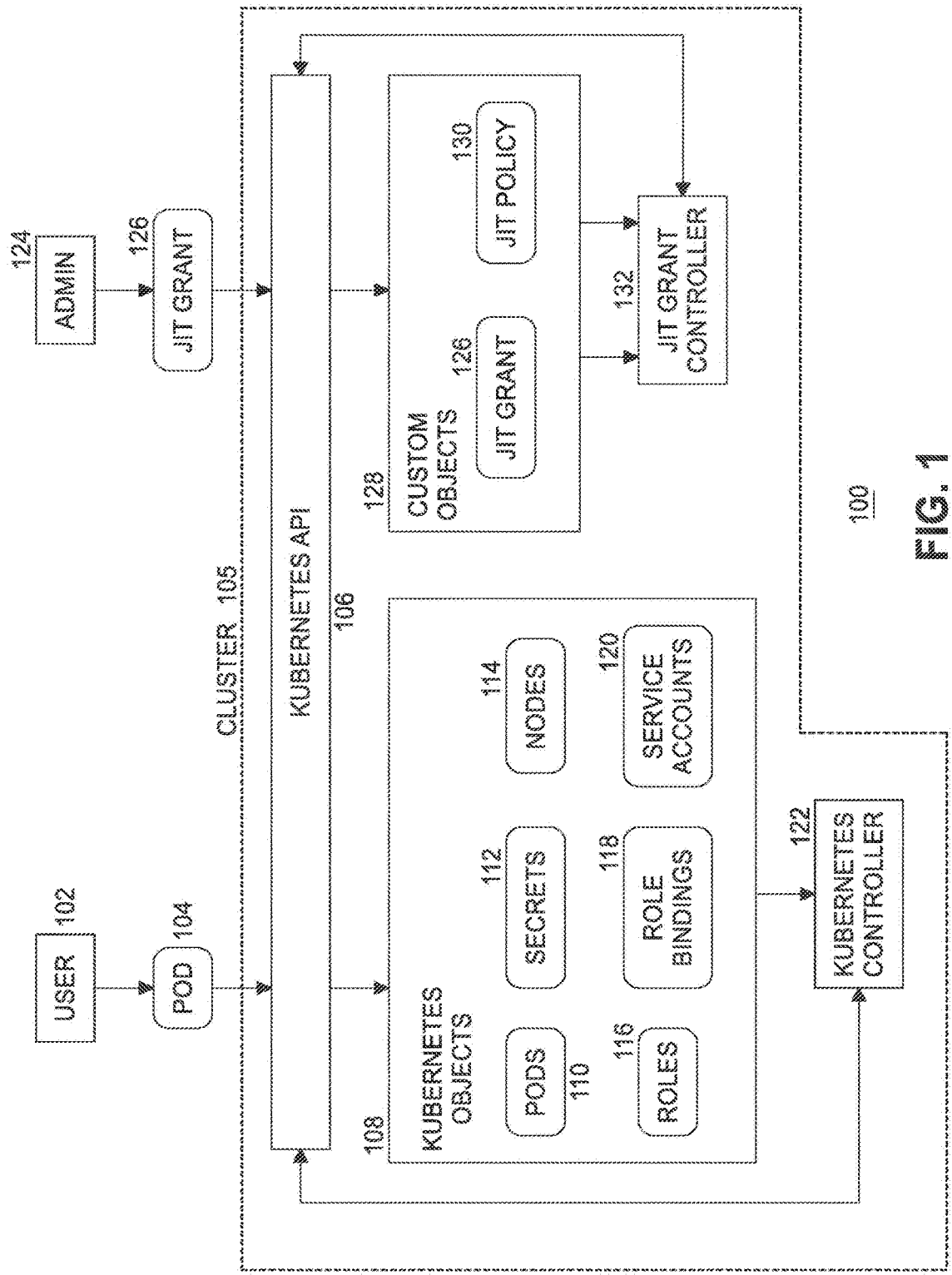
FIG. 1 illustrates a Kubernetes computing environment including a cluster according to some embodiments.

FIG. 1 illustrates a Kubernetes computing environment 100, including a cluster 105, according to some embodiments. Kubernetes software abstracts cloud computing infrastructure components into declarative application programming interfaces (APIs). Kubernetes is described on the Internet at Kubernetes.io*docs*concepts*overview*what-is-kubernetes (with "/" being replaced by "*" to prevent live links), incorporated herein by reference. The Kubernetes model allows users, such as user 102 and system administrator (admin) 124, to state their requirements as a desired state to Kubernetes API 106. The Kubernetes software then tries to implement that desired state. For example, instead of a user directing Kubernetes that the user wants his or her computing workload running on specific computing machines A, B and C, the Kubernetes model is one in which the user (e.g., a software developer) instead declares the desired state of three replicas of the workload running somewhere in a cluster 105 of computing resources in a cloud computing environment. Kubernetes controller 122 then finds available computing machines (not shown in FIG. 1) and manages the processing of the user's workload.

A Kubernetes cluster 105 is a set of computing machines for running containerized applications. At a minimum, a cluster contains a worker node and a master node. The master node is responsible for maintaining the desired state of the cluster, such as which applications are running and which container images they use. Worker nodes execute the applications and workloads. Cluster 105 embodies an advantage of Kubernetes: the ability to schedule and run containers across a group of computing machines, be they physical or virtual, on premises or in a cloud computing environment. A cluster defines a single instance of Kubernetes, and all computing machines (e.g., nodes) and resources (e.g., pods, containers, etc.) that the cluster controls.

Kubernetes containers are not tied to individual computing machines. Instead, containers are abstracted across the cluster 105.

In a typical scenario, user 102 wants to use Kubernetes to manage performance of a workload. User 102 passes a pod 104 to Kubernetes API 106 to schedule a container. Kubernetes API 106 provides access to a plurality of Kubernetes objects 108. Kubernetes controller 122 interacts with Kubernetes API 106 and Kubernetes objects 108 to manage a user's workload. In Kubernetes, controllers are control loops that monitor the state of a cluster and then make or request changes where needed. Each controller tries to move the current cluster state closer to the desired state.

Kubernetes objects 108 include, but are not limited to, one or more pods 110, one or more secrets 112, one or re nodes 114, one or more roles 116, one or more role bindings 118, and one or more service accounts 120. The full list of Kubernetes API objects (also called "resources") can be found on the Internet at: godoc.org*k8s.io*api*core*v1, incorporated herein by reference.

A pod 110 is a group of containers that are deployed together on the same host computing system. Secrets 112 contain sensitive data such as a password, token, or a key to be used by a pod or code image. Kubernetes secrets are described on the Internet at kubernetes.io*docs* concepts*configuration*secret*#overview-of-secrets, incorporated herein by reference.

Kubernetes runs a user's workload by placing containers into pods to run on nodes 114. A node 114 may be a virtual or physical machine, depending on the cluster. Each node contains the services necessary to run pods 110 and is managed by Kubernetes controller 122. Role 116 contains rules that represent a set of permissions. Permissions are purely additive (there are no "deny" rules). A role sets permissions within a particular namespace; when a role is created, the namespace that he role belongs in is also specified. A namespace provides the scope for pods 110, services, and deployments in a cluster. A namespace in Kubernetes is a construct to allow different projects, teams, or customers to share a Kubernetes cluster. A namespace provides a scope for object names and a mechanism to attach an authorization and policy to a subsection of the cluster. Each object in the cluster has a name that is unique for that type of resource. Every Kubernetes object also has a universally unique identifier (ID) (UUID) that is unique across a cluster. Role binding 118 grants the permissions defined in a role to a user or set of users within a namespace. Role binding 118 holds a list of subjects (e.g., users, groups, or service accounts), and a reference to the role being granted. A service account 120 provides an identity for the bearer of its token to authenticate with the Kubernetes API. Information describing Kubernetes roles and role bindings may be found on the Internet at https:**kubernetes.io*docs* reference*access-authn-authz*rbac*#role-example, incorporated herein by reference. Information describing Kubernetes service accounts may be found on the Internet at https:**kubernetes.io*docs*reference*access-authn-authz*authentication*#users-in-kubernetes, incorporated herein by reference.

Kubernetes API 106 is a pluggable API that allows for the definition and registration of resources beyond the standard set of "core" resources defined in the Kubernetes code. This modularity allows for custom logic to be implemented outside of the core Kubernetes API 106 in a custom controller and for this custom controller to be deployed separately from the "core" Kubernetes API. By allowing Custom Resource Definitions (CRD), Kubernetes allows third parties to register their own custom resource types with the core Kubernetes API but delegate the business logic of those resources to custom controllers. Information describing Kubernetes Custom Resources may be found on the Internet at https:**kubernetes.io*docs*concepts*extend-kubernetes*api-extension*custom-resources*, incorporated herein by reference. This model allows users of these CRDs to utilize the full set of tools made possible by Kubernetes (such as "kubectl"), but the custom business-specific logic can be deployed, maintained, and updated separately from Kubernetes itself. In short, CRDs can be developed privately without the input of the Kubernetes community to implement custom functionality and business logic specific to a business's needs. In embodiments of the present invention, CRDs are used to define custom resources managed by a custom controller. The custom controller is registered and known to the Kubernetes API.

In embodiments of the present invention, a novel just in time (JIT) grant controller 132 extends the Kubernetes model to provide JIT access controls to Kubernetes clusters 105. A system administrator (admin 124) declares the capability for a user to have access to a cluster 105 for a specified period of time (e.g., a time to live (TTL) value) and JIT grant controller 132 controls the access privileges (e.g., creating access when needed and deleting access when the time has expired).

An advantage of this system of using declarative/desired state (and Kubernetes in general) is the power of extensibility and what additional functionality that can be built atop the abstraction. For example, some of the capabilities that may be provided include: auditing of the total elapsed amount of time a user has access to cluster 105; restricting a user to access selected production systems in a cluster for a specified number of hours per month; restricting a user to access to a specified number (and/or list) of namespaces at any one time; granting access to non-namespace scoped resources via Cluster Role & Cluster Role Binding; and total instant revocation of access privileges for a user across the cluster of computing machines. Many other examples of Kubernetes cluster access and control using embodiments of the present invention are contemplated.

Kubernetes Operators are software extensions to Kubernetes that make use of Custom Resources to manage applications and their components. Operators follow Kubernetes principles. The Operator pattern allows a system administrator to manage a service or set of services. System administrators who manage specific applications and/or services have knowledge of how the applications and services ought to behave, how to deploy them in the cloud computing environment, and how to react if there are problems. Users who run workloads on Kubernetes often use automation to implement repeatable tasks. The Operator pattern captures how one can write code to automate a task beyond what Kubernetes itself provides. The concept of controllers in Kubernetes provides for a cluster's capabilities to be extended without modifying the code of Kubernetes itself. Operators are clients of the Kubernetes API that act as controllers for a Custom Resource.

One way to deploy an Operator is to add the Custom Resource Definition and its associated controller to a cluster. The controller will normally run outside of the Kubernetes control plane, similar to running any containerized application. An Operator (and associated controller) may be implemented using any language/runtime that can act as a client for the Kubernetes API.

The novel JIT grant operator of embodiments of the present invention (and associated JIT grant controller 132) allows administrators (e.g., admin 124) of Kubernetes clusters to provide time-based temporary access to a cluster 105 in a way that is simple, declarative and works across all Kubernetes cloud services providers (CSPs). In one implementation, embodiments utilize the Kubernetes Controller Pattern to monitor Custom Resources and make changes to the service accounts 120, roles 116, and role bindings 118 managed by Kubernetes. These resources are present in all Kubernetes clusters regardless of CSP, thereby allowing embodiments to work in any cloud computing environment provided by any CSP. Information describing the Kubernetes Controller Pattern may be found on the Internet at https:**kubernetes.io*docs*concepts*architecture* controller*#controller-pattern (with "/" being replaced by "*" to prevent live links), incorporated herein by reference.

The functionality enabled by the novel JIT operator is made possible by exposing Kubernetes Custom Resource definitions as an interface through which access can be declaratively granted and controlled. This interface allows an administrator to assign time-based access within a namespace, and JIT grant controller 132 validates the request and manages access.

JIT grant controller 132 interacts with Kubernetes API 106 via the Controller Pattern. The JIT grant controller subscribes to the Kubernetes API and is notified of any events relating to custom objects 128, such as JIT grant 126 or JIT policy 130. When an administrator declares a request for access for a user, the administrator creates a JIT grant 126 with Kubernetes API 106. JIT grant controller 132 is notified of the new JIT grant 126 being created. JIT grant controller 132 validates the fields in the created JIT grant and if validation succeeds, the JIT grant controller grants access for the user. After the length of time in the time to live (TTL) specified in the JIT grant elapses, the JIT grant controller revokes access for the specified user.

JIT grant controller 132 grants and revokes access to a Kubernetes cluster at the same times that access is granted and expires, respectively. This is done by creating the service account 120, role 116 and role binding 118 resources only when access is granted and deleting these resources when the access is revoked or the authorized time for access expires. Other existing systems or implementations may leave some of these resources orphaned. In embodiments of the present invention, these resources are created only at the time they are needed and deleted at the time they are revoked.

Figure 2:
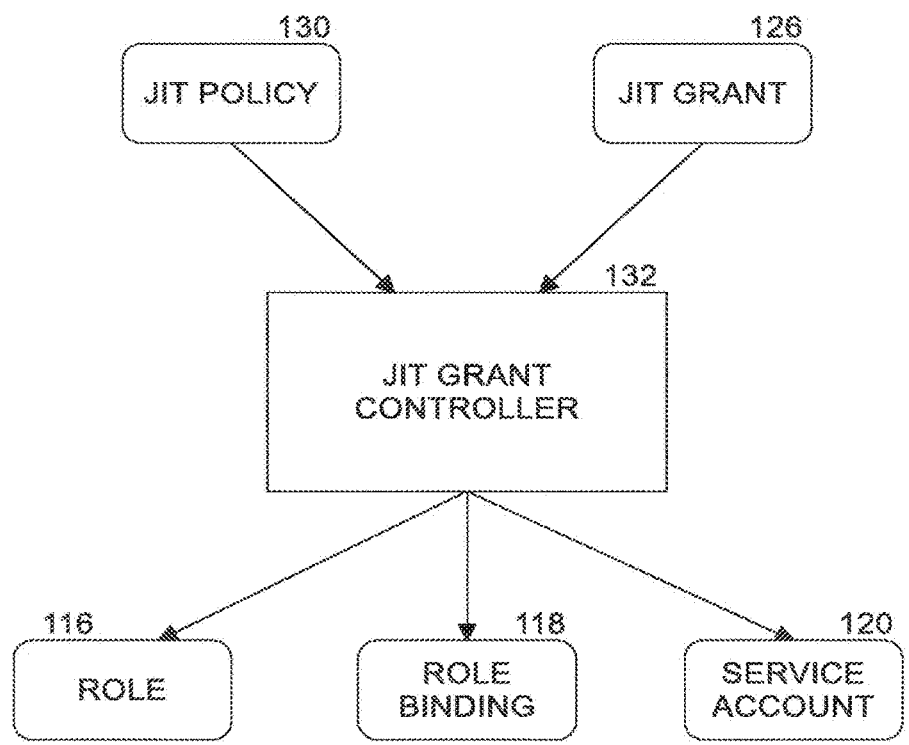
FIG. 2 is a diagram of input data items and output data items for a JIT grant controller according to some embodiments.

FIG. 2 is a diagram 200 of input data items and output data items for JIT grant controller 132 according to some embodiments. JIT grant controller 132 accepts one or more JIT policies 130 and one or more JIT grants 126. JIT grant controller 132 processes JIT policy 130 and JIT grant 126 and sets service account 120, role 116 and role binding 118 for the user reflecting the combination of JIT policy 130 and JIT grant 126.

Figure 3:
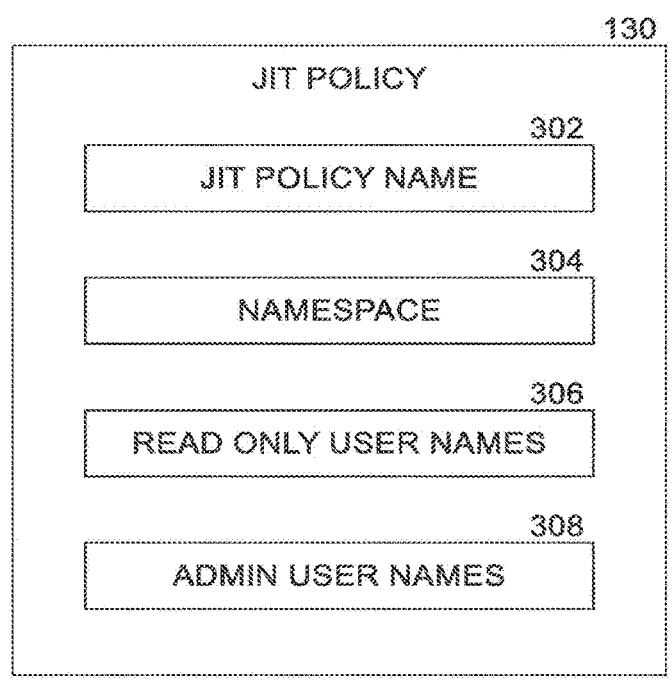
FIG. 3 is a diagram of a JIT policy according to some embodiments.

FIG. 3 is a diagram of a JIT policy 130 according to some embodiments. In an embodiment, JIT policy 130 is created by system administrator 124 to define a JIT policy. JIT policy 130 is a namespace-scoped Custom Resource used to declare an authorization policy of users for the namespace. In an embodiment, JIT policy 130 includes a name 302 of the JIT policy, a namespace 304 in which access is to be allowed, a list of one or more user names 306 of users who are authorized to have read-only permission on the namespace, and a list one or more of admin user names 308 of admins who are authorized to have admin permissions on the namespace.

Figure 4:
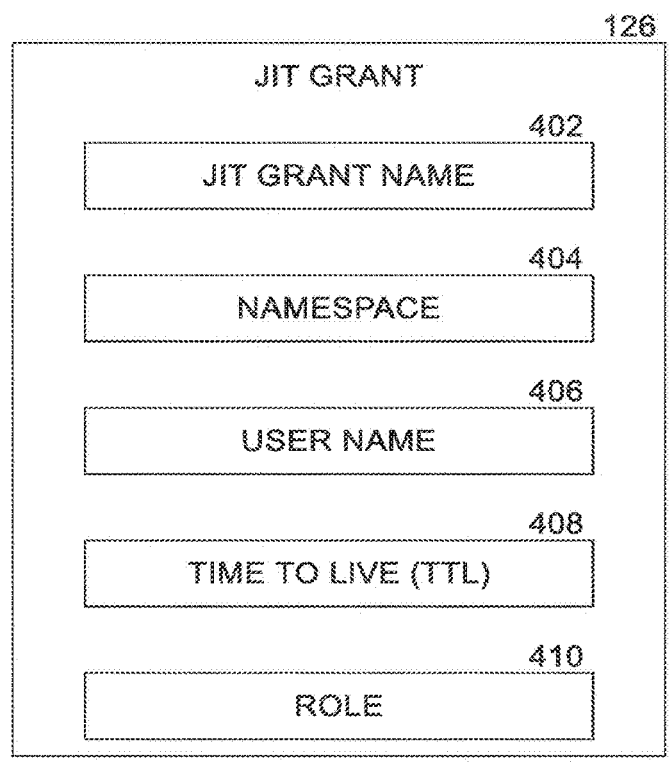
FIG. 4 is a diagram of a JIT grant according to some embodiments.

FIG. 4 is a diagram of a JIT grant 126 according to some embodiments. In an embodiment, JIT grant 126 is created by system administrator 124 for a user. JIT grant 126 is a namespace-scoped Custom Resource representing time-restricted access of a specific user to a specific namespace. In an embodiment, JIT grant 126 includes a name 402 of the JIT grant, a namespace 404 for application of the JIT grant, a user name 406 of a user who is being authorized to access the namespace, a time to live (TTL) 408 defining the length of time following the creation of JIT grant 126 in which access is to be allowed for the user, and a role 410 defining the desired role the user has during authorized access to the namespace. In an embodiment, a negative TTL 408 indicates no expiration of access.

Figure 5:
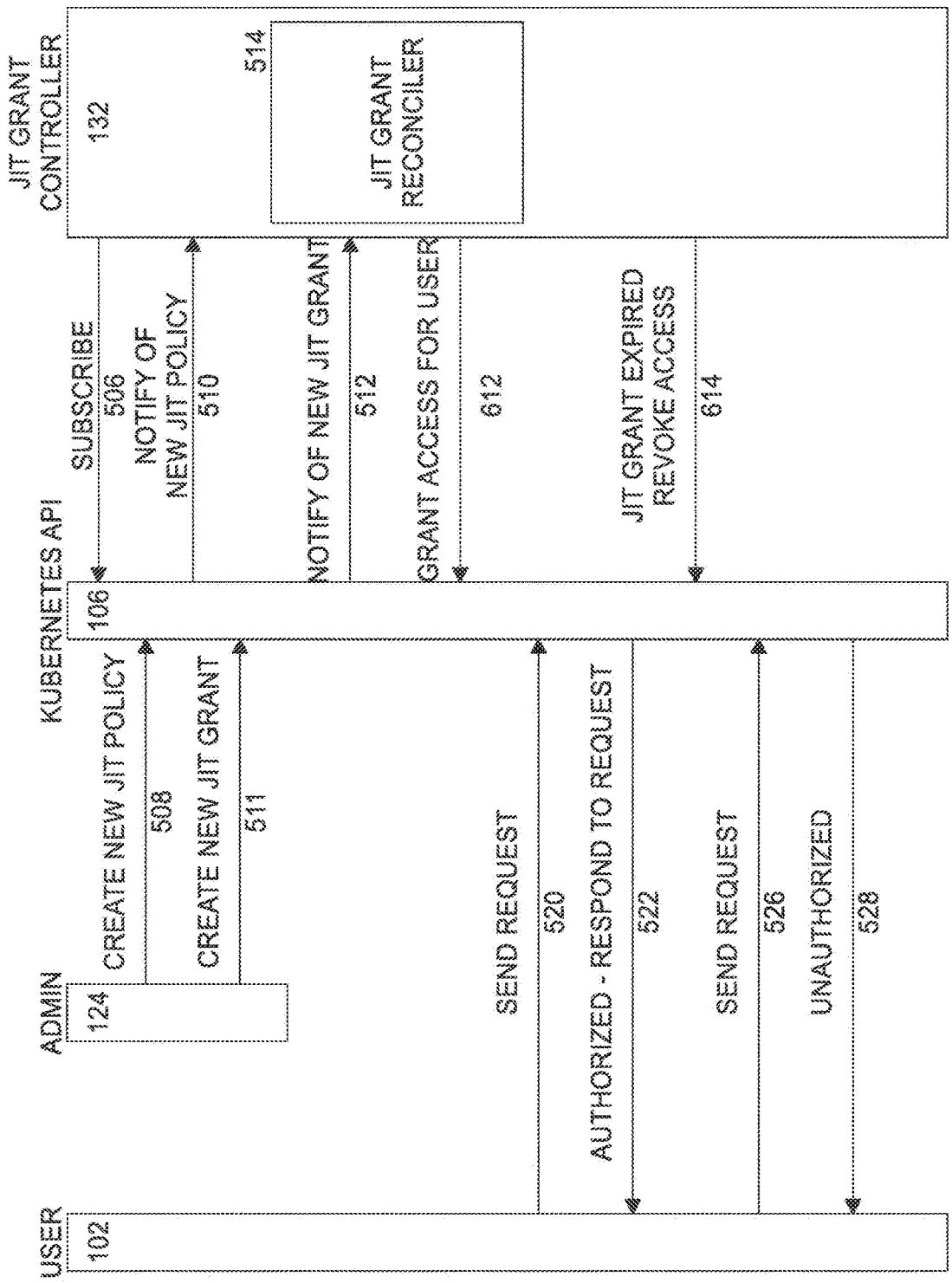
FIG. 5 is a first flow diagram of JIT grants and Kubernetes cluster access processing according to some embodiments.

FIG. 5 is a first flow diagram 500 of JIT grants 126 and Kubernetes cluster access processing according to some embodiments. First, when JIT controller 132 is deployed, the JIT controller subscribes to Kubernetes API 106 at action 506. An admin 124 creates a new JIT policy 130 for a specified namespace 304 at action 508 by making a call to Kubernetes API 106. Admin 124 may create multiple JIT policies. When a new JIT policy is created, Kubernetes API 106 notifies JIT grant controller 132 of the new JIT policy 130 at action 510. Admin 124 creates a new JIT grant 126 for a user 102 at action 511 by making a call to Kubernetes API 106. Admin 124 may create multiple JIT grants 126. Admin 124 may create multiple JIT grants 126 per JIT policy 130, and multiple JIT grants per user (for example, for different namespaces). When a new JIT grant is created, Kubernetes API 106 notifies JIT grant controller 132 of the new JIT grant 126 at action 512. JIT grant reconciler 514 of JIT grant controller 132 reconciles the new JIT grant and if the JIT grant is validated, JIT grant controller 132 grants access for user 102 (e.g., indicated by user name 406) to specified namespace 404 for a time period specified by the TTL 408 at action 612. Subsequently, a user 102 may send a request to Kubernetes API 106 to access a namespace at action 520. If the user is authorized to access the namespace by JIT policy 130 and JIT grant 126, Kubernetes API 106 (and associated system resources) implements the request and notifies the user that access to the namespace is authorized and sends a response to the user's request at action 522. After a sufficient time has elapsed such that the TTL 408 expires, JIT grant controller 132 notifies Kubernetes API 106 that the JIT grant has expired and access by the user to the selected namespace is to be revoked at action 614. After access is revoked, if user 102 sends another request to Kubernetes API 106 at action 526, the Kubernetes API will respond at action 528 that access is now unauthorized. Kubernetes API 106 will not implement the user's request.

Figure 6:
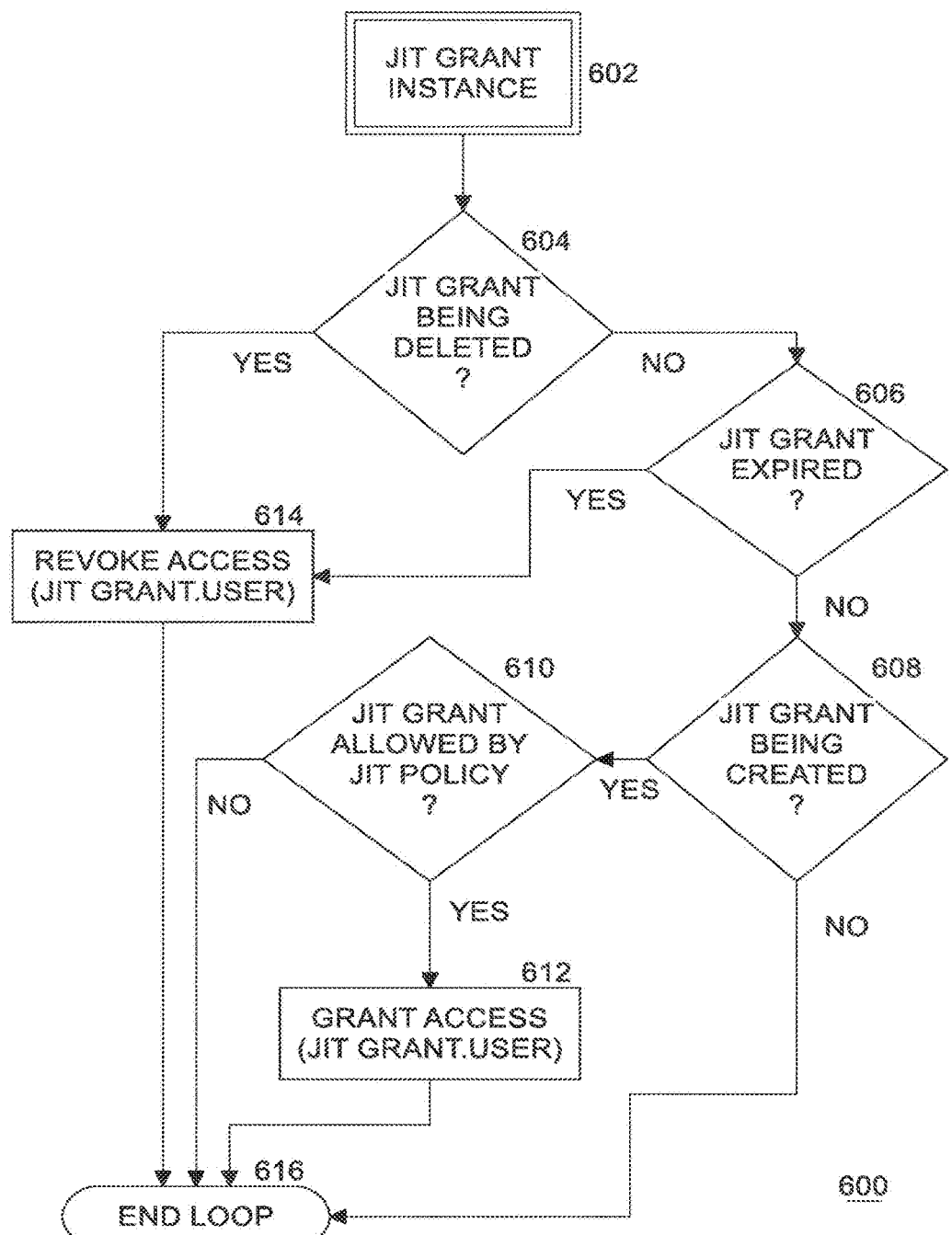
FIG. 6 is a flow diagram of JIT grant reconciler processing according to some embodiments.

FIG. 6 is a flow diagram 600 of JIT grant reconciler 514 processing according to some embodiments. In an embodiment, every time a new instance 602 of a JIT grant is created, a notification of this event is received at action 512 and is processed by JIT grant reconciler 514. Processing of a JIT grant instance 602 starts at block 604. At block 604 a check is made to determine if the JIT grant 126 is being deleted (according to the notification received from Kubernetes API 106). If the JIT grant is being deleted, access to the namespace for the user 102 is revoked at block 614. Processing ends at block 616, where control waits for another JIT grant notification, or for an existing JIT Grant instance 602 to expire. If the JIT grant is not being deleted, processing continues with block 606 where JIT grant instance 602 checks if the JIT grant is expired. If the JIT grant 126 is expired, access to the namespace for the user 102 is revoked at block 614. If the JIT grant is not expired, then if the JIT grant is being created at block 608, processing continues with block 610 where JIT grant controller 132 determines if the JIT grant is allowed by the relevant JIT policy 130. If the JIT grant 126 is allowed by the JIT policy 130, then access to the namespace is granted at block 612 and processing control loops at block 616 back to the beginning of the control loop to wait for another JIT grant notification. If the JIT grant 126 is not allowed by the JIT policy 130, processing continues directly to end loop 616. At block 608, if the JIT grant is not being created, then processing continues with end loop 616.

Figure 7:
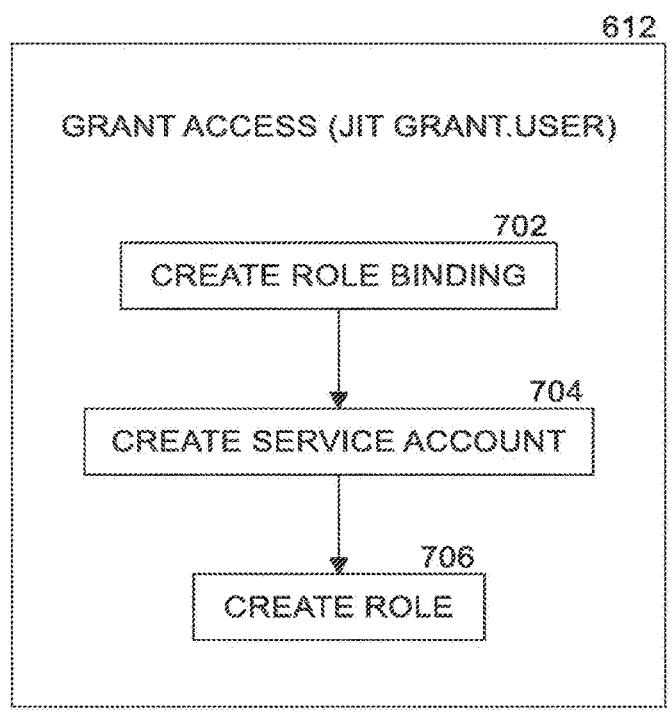
FIG. 7 is a flow diagram of grant access processing according to some embodiments.

FIG. 7 is a flow diagram of grant access processing 612 according to some embodiments. At block 702, JIT grant reconciler 514 creates a role binding 118 for the user 102. In an embodiment, this comprises a call to Kubernetes API 106. At block 704, JIT grant reconciler 514 creates a service account 120 for the user. In an embodiment, this comprises a call to Kubernetes API 106. At block 706, JIT grant reconciler 514 creates a role 116 for the user. In an embodiment, this comprises a call to Kubernetes API 106.

Figure 8:
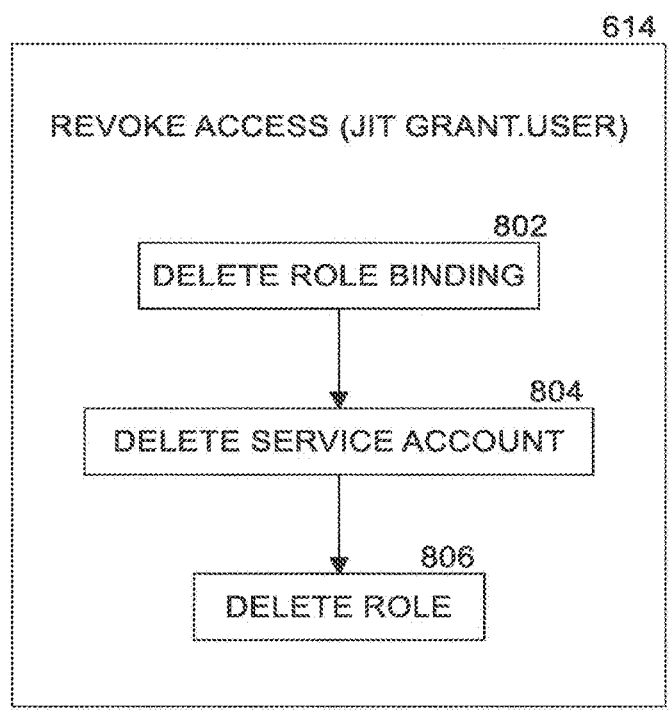
FIG. 8 is a flow diagram of revoke access processing according to some embodiments.

FIG. 8 is a flow diagram of revoke access processing 614 according to some embodiments. At block 802, JIT grant reconciler 514 deletes the role binding 118 for the user 102. In an embodiment, this comprises a call to Kubernetes API 106. At block 804, JIT grant reconciler 514 deletes the service account 120 for the user. In an embodiment, this comprises a call to Kubernetes API 106. At block 806, JIT grant reconciler 514 deletes the role 116 for the user. In an embodiment, this comprises a call to Kubernetes API 106.

Figure 9:
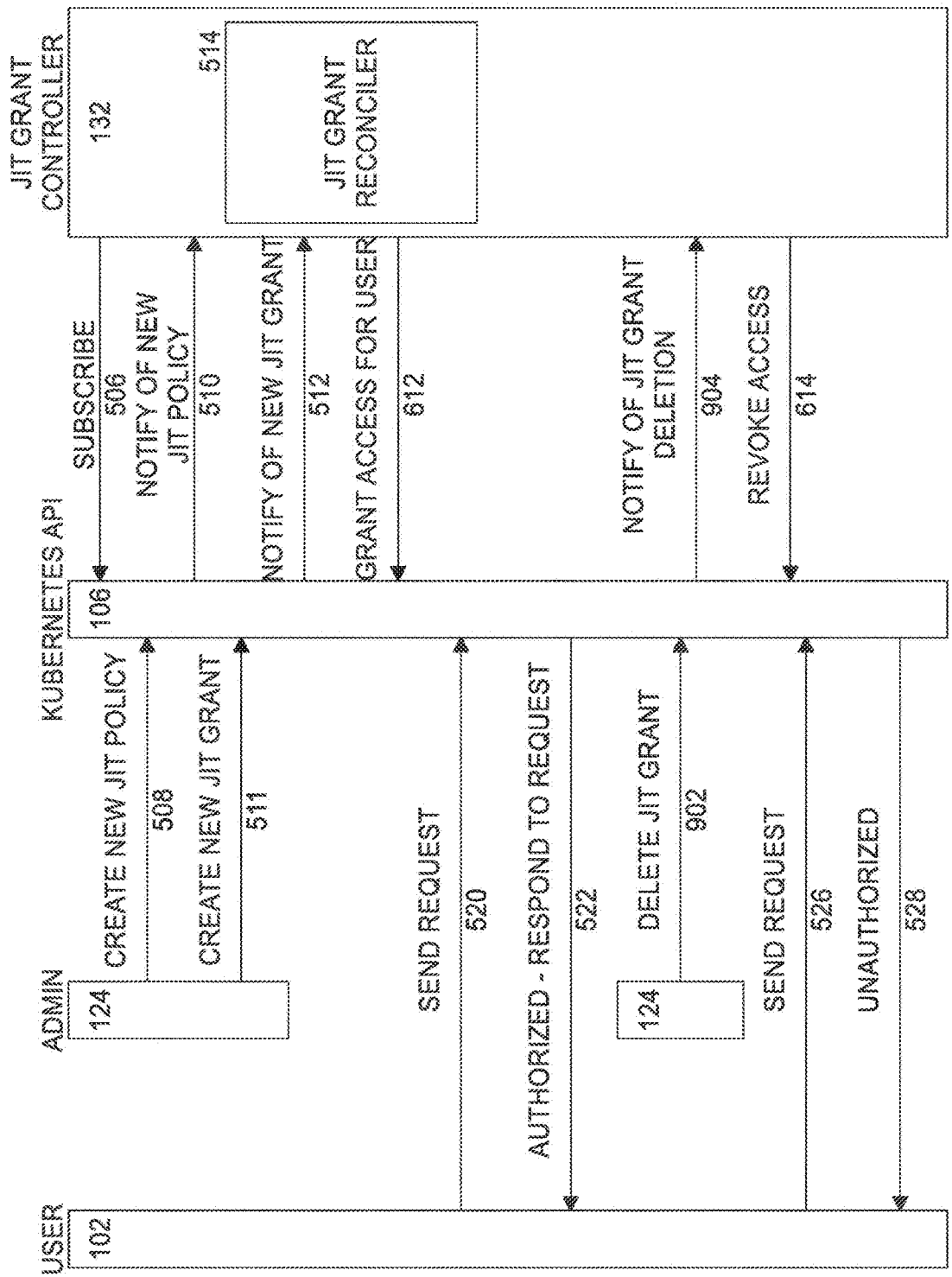
FIG. 9 is a second flow diagram of JIT grants and Kubernetes cluster access processing according to some embodiments.

FIG. 9 is a second flow diagram 900 of JIT grants and Kubernetes cluster access processing according to some embodiments. First, when JIT controller 132 is deployed, the JIT controller subscribes to Kubernetes API 106 at action 506. An admin 124 creates a new JIT policy 130 for a specified namespace 304 at action 508 by making a call to Kubernetes API 106. Admin 124 may create multiple JIT policies. When a new JIT policy is created, Kubernetes API 106 notifies JIT grant controller 132 of the new JIT policy 130 at action 510. Admin 124 creates a new JIT grant 126 for a user 102 at action 511 by making a call to Kubernetes API 106. Admin 124 may create multiple JIT grants. Admin 124 may create multiple JIT grants per JIT policy 130, and multiple JIT grants per user (for example, for different namespaces). When a new JIT grant is created, Kubernetes API 106 notifies JIT grant controller 132 of the new JIT grant at action 512. JIT grant reconciler 514 of JIT grant controller 132 reconciles the new JIT grant and if the JIT grant is validated, JIT grant controller 132 grants access for user 102 to specified namespace 404 for a time period specified by the TTL 408 at action 612. Subsequently, the user 102 may send a request to Kubernetes API 106 to access a namespace at action 520. If the user is authorized to access the namespace by JIT policy 130 and JIT grant 126, Kubernetes API 106 (and associated system resources) implements the request and notifies the user that access to the namespace is authorized and sends a response to the user's request at action 522. In one scenario, a system administrator may want to delete the JIT grant. In this case, Admin 124 sends a delete JIT grant request at action 902 to Kubernetes API 106. The Kubernetes API then notifies JIT grant controller 132 of the JIT grant deletion at action 904. JIT grant controller 132 revokes access and notifies Kubernetes API 106 to revoke access for the user to the namespace at action 614. After access is revoked, if user 102 sends another request to Kubernetes API 106 at action 526, the Kubernetes API will respond at action 528 that access is now unauthorized. Kubernetes API 106 will not implement the user's request.

Figure 10:
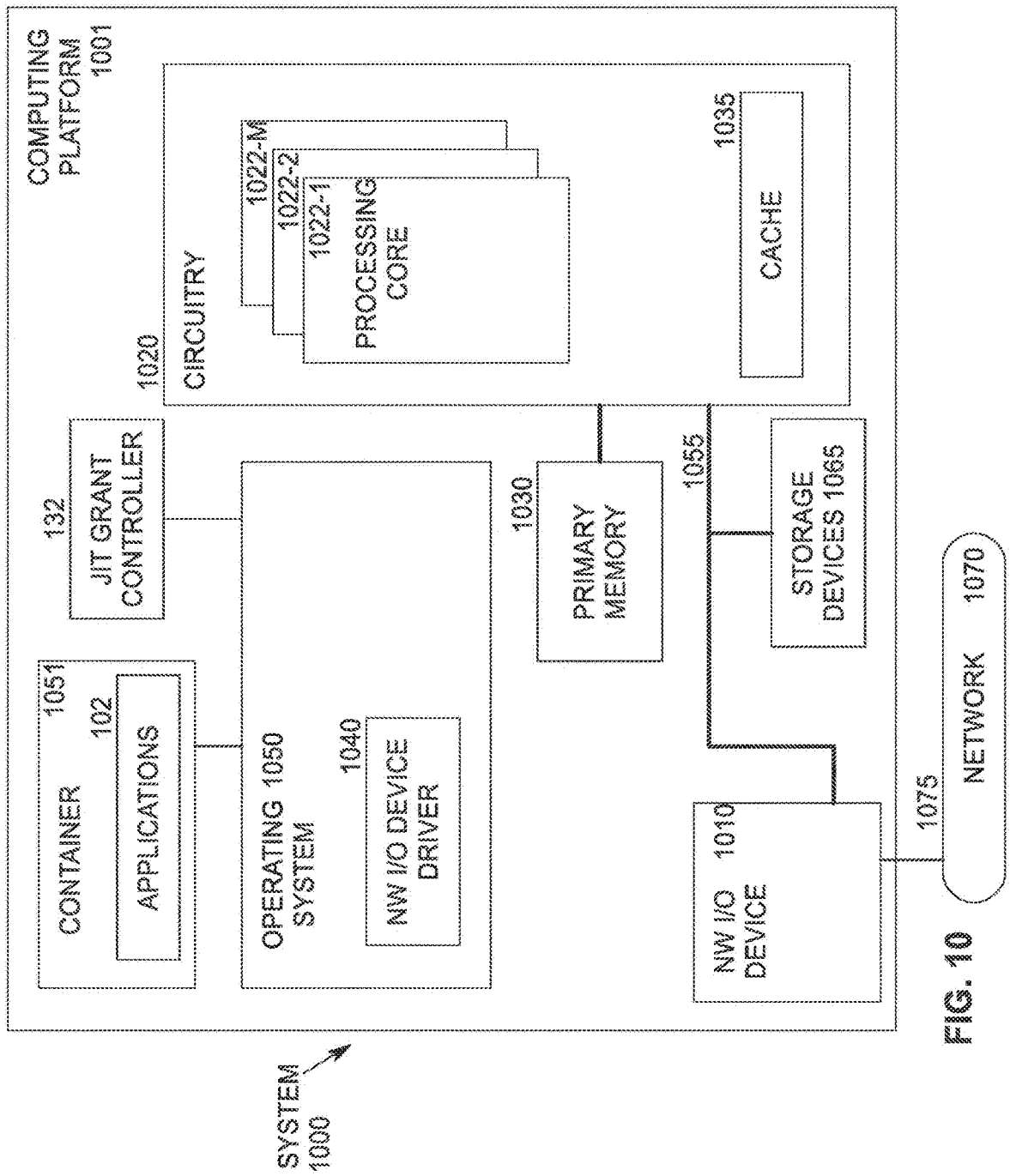
FIG. 10 illustrates an example computing system according to some embodiments.

FIG. 10 illustrates an example computing system 1000 for implementing Kubernetes API 106 and/or JIT grant controller 132. As shown in FIG. 10, computing system 1000 includes a computing platform 1001 coupled to a network 1070 (which may be the Internet, for example). In some examples, as shown in FIG. 10, computing platform 1001 is coupled to network 1070 via network communication channel 1075 and through at least one network (NW) input/output (I/O) device 1010. In an embodiment, network I/O device 1010 comprises a switch, a network interface controller (NIC) having one or more destination ports (not shown) connected or coupled to network communication channel 1075. In an embodiment, network communication channel 1075 includes a PHY device (not shown). In an embodiment, network I/O device 1010 includes an Ethernet NIC. Network I/O device 1010 transmits data packets from computing platform 1001 over network 1070 to other destinations and receives data packets from other destinations for forwarding to computing platform 1001.

According to some examples, computing platform 1001, as shown in FIG. 10, includes circuitry 1020, primary memory 1030, operating system (OS) 1050, NW I/O device driver 1040, at least one application 102 running in a container 1051, Kubernetes API 106 and/or JIT grant controller 132, and one or more storage devices 1065. In one embodiment, OS 1050 is Linux™ In another embodiment, OS 1050 is Windows® Server. Other OSs may also be used. Network I/O device driver 1040 operates to initialize and manage I/O requests performed by network I/O device 1010. In an embodiment, packets and/or packet metadata transmitted to network I/O device 1010 and/or received from network I/O device 1010 are stored in one or more of primary memory 1030 and/or storage devices 1065. In one embodiment, at least one application 102 is a database management system.

In one embodiment, JIT grant controller 132 runs in a container 1051. In another embodiment, JIT grant controller 132 is implemented in circuitry 1020.

In at least one embodiment, storage devices 1065 may be one or more of hard disk drives (HDDs) and/or solid-state drives (SSDs). In an embodiment, storage devices 1065 may be non-volatile memories (NVMs). In some examples, as shown in FIG. 10, circuitry 1020 may communicatively couple to network I/O device 1010 via communications link 1055. In one embodiment, communications link 1055 is a peripheral component interface express (PCIe) bus conforming to version 3.0 or other versions of the PCIe standard published by the PCI Special Interest Group (PCI-SIG).

In some examples, operating system 1050, NW I/O device driver 1040, Kubernetes API 106, JIT grant controller 132, container 1051, and application 102 are implemented, at least in part, via cooperation between one or more memory devices included in primary memory 1030 (e.g., volatile or non-volatile memory devices), storage devices 1065, and elements of circuitry 1020 such as processing cores 1022-1 to **1022-*m*, where "m" is any positive whole integer greater than 2. In an embodiment, OS 1050, container 1051, NW I/O device driver 1040, JIT grant controller 202, VM 1061 and application 102 are executed by one or more processing cores 1022-1 to 1022-*m***.

In some examples, computing platform 1001, includes but is not limited to a server, a server array or server farm, a web server, a network server, an Internet server, a work station, a mini-computer, a main frame computer, a supercomputer, a network appliance, a web appliance, a distributed computing system, multiprocessor systems, processor-based systems, a laptop computer, a tablet computer, a smartphone, a system-on-a-chip (SoC), or a combination thereof. In one example, computing platform 1001 is a disaggregated server. A disaggregated server is a server that breaks up components and resources into subsystems (e.g., network sleds). Disaggregated servers can be adapted to changing storage or compute loads as needed without replacing or disrupting an entire server for an extended period of time. A server could, for example, be broken into modular compute, I/O, power and storage modules that can be shared among other nearby servers.

Circuitry 1020 having processing cores 1022-1 to **1022-*m* may include various commercially available processors, including without limitation Intel® Atom®, Celeron®, Core (2) Duo®, Core i3, Core i5, Core i7, Itanium®, Pentium®, Xeon® or Xeon Phi® processors, ARM processors, and similar processors. Circuitry 1020 may include at least one cache 1035** to store data.

According to some examples, primary memory 1030 may be composed of one or more memory devices or dies which may include various types of volatile and/or non-volatile memory. Volatile types of memory may include, but are not limited to, dynamic random-access memory (DRAM), static random-access memory (SRAM), thyristor RAM (TRAM) or zero-capacitor RAM (ZRAM). Non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above. In another embodiment, primary memory 1030 may include one or more hard disk drives within and/or accessible by computing platform 1001.

Figure 11:
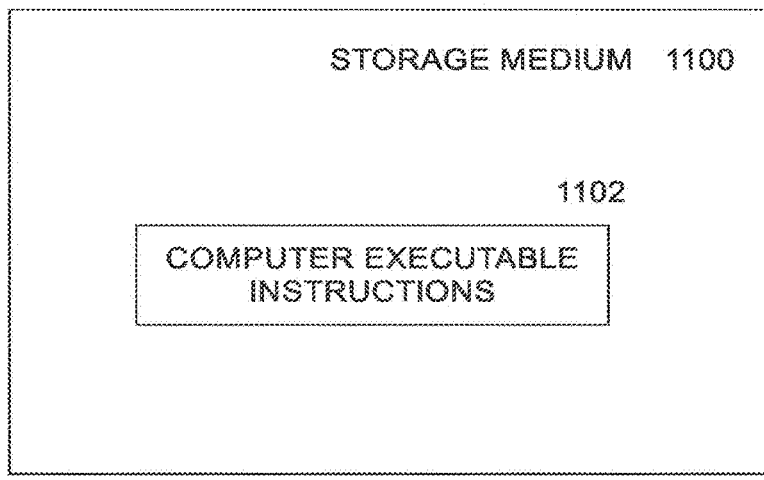
FIG. 11 illustrates an example of a storage medium.

FIG. 11 illustrates an example of a storage medium 1100. Storage medium 1100 may comprise an article of manufacture. In some examples, storage medium 1100 includes any non-transitory tangible computer readable medium or machine readable medium, such as an optical, magnetic or semiconductor storage. Storage medium 1100 may store various types of computer executable instructions, such as instructions 1102 to implement logic flows and systems described above in FIGS. 1 through 9. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 12:
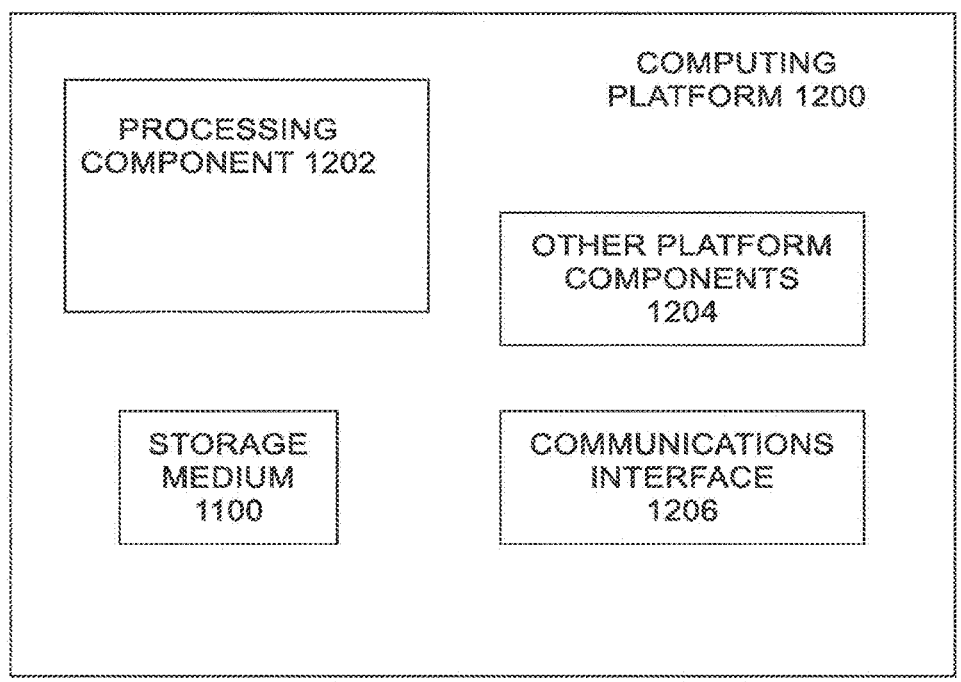
FIG. 12 illustrates another example computing platform.

FIG. 12 illustrates an example computing platform 1200. In some examples, as shown in FIG. 12, computing platform 1200 may include a processing component 1202, other platform components 1204 and/or a communications interface 1206.

According to some examples, processing component 1202 may execute processing operations or logic for instructions stored on storage medium 1100 (and described above with reference to FIGS. 1 through 9). Processing component 1202 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1204 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), types of non-volatile memory such as 3-D cross-point memory that may be byte or block addressable. Non-volatile types of memory may also include other types of byte or block addressable non-volatile memory such as, but not limited to, multi-threshold level NAND flash memory, NOR flash memory, single or multi-level PCM, resistive memory, nanowire memory, FeTRAM, MRAM that incorporates memristor technology, STT-MRAM, or a combination of any of the above. Other types of computer readable and machine-readable storage media may also include magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1206 may include logic and/or features to support a communication interface. For these examples, communications interface 1206 may include one or more communication interfaces that operate according to various communication protocols or standards to communicate over direct or network communication links or channels. Direct communications may occur via use of communication protocols or standards described in one or more industry standards (including progenies and variants) such as those associated with the peripheral component interconnect express (PCIe) specification. Network communications may occur via use of communication protocols or standards such those described in one or more Ethernet standards promulgated by the Institute of Electrical and Electronics Engineers (IEEE). For example, one such Ethernet standard may include IEEE 802.3. Network communication may also occur according to one or more OpenFlow specifications such as the OpenFlow Switch Specification.

The components and features of computing platform 1200, including logic represented by the instructions stored on storage medium 1100 may be implemented using any combination of discrete circuitry, ASICs, logic gates and/or single chip architectures. Further, the features of computing platform 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASIC, programmable logic devices (PLD), digital signal processors (DSP), FPGA, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples include an article of manufacture or at least one computer-readable medium. A computer-readable medium includes a non-transitory storage medium to store logic. In some examples, the non-transitory storage medium includes one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Included herein are logic flows or schemes representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow or scheme may be implemented in software, firmware, and/or hardware. In software and firmware embodiments, a logic flow or scheme may be implemented by computer executable instructions stored on at least one non-transitory computer readable medium or machine readable medium, such as an optical, magnetic or semiconductor storage. The embodiments are not limited in this context.

Some examples are described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system, comprising:
   a processing device; and
   a memory device, the processing device configurable to cause:
   processing a policy configuration of just in time (JIT) access received via an interface, the policy configuration specifying a role and duration;
   determining if access to a cluster by a user is authorized according to the policy configuration based, at least in part, on a role of the user;

granting, to the user, JIT access to the cluster for the duration responsive to determining that access is authorized according to the policy configuration, wherein granting, to the user, JIT access to the cluster includes creating a role binding for the user; and revoking access by the user to the cluster if the duration is expired;

wherein revoking access includes deleting the role binding.

2. The system of claim 1, the processing device further configurable to cause:

verifying that JIT access is working by accessing the cluster.

3. The system of claim 1, the processing device further configurable to cause:

associating a group with the policy configuration; and assigning the role to the group.

4. The system of claim 1, the duration being specified by a start time and end time.

5. The system of claim 1, the processing device further configurable to cause:

associating a resource type with the policy configuration.

6. The system of claim 1, the processing device further configurable to cause:

authorizing access by the user to the cluster if the duration has not expired.

7. A computer-implemented method, comprising:

receiving, via an interface, a policy configuration of a just in time (JIT) access, the policy configuration specifying a role and a duration;

processing the policy configuration of the JIT access;

determining if access to a cluster by a user is authorized according to the policy configuration based, at least in part, on a role of the user;

granting, to the user, JIT access to the cluster for the duration responsive to determining that access is authorized according to the policy configuration, wherein granting, to the user, JIT access to the cluster includes creating a role binding for the user; and revoking access by the user to the cluster if the duration is expired;

wherein revoking access includes deleting the role binding.

8. The computer-implemented method of claim 7, further comprising:

verifying that JIT access is working by accessing the cluster.

9. The computer-implemented method of claim 7, further comprising:

associating a group with the policy configuration; and assigning the role to the group.

10. The computer-implemented method of claim 7, the duration being specified by a start time and end time.

11. The computer-implemented method of claim 7, further comprising:

associating a resource type with the policy configuration.

12. The computer-implemented method of claim 7, further comprising authorizing access by the user to the cluster if the duration has not expired.

13. At least one tangible non-transitory machine-readable medium comprising a plurality of instructions that in response to being executed by a processor in a computing system, are configurable to cause the processor to:

process a policy configuration of just in time (JIT) access received via an interface, the policy configuration specifying a role and duration;

determine if access to a cluster by a user is authorized according to the policy configuration based, at least in part, on a role of the user;

grant, to the user, JIT access to the cluster for the duration responsive to determining that access is authorized according to the policy configuration, wherein granting, to the user, JIT access to the cluster includes creating a role binding for the user; and revoking access by the user to the cluster if the duration is expired;

wherein revoking access includes deleting the role binding.

14. The at least one tangible non-transitory machine-readable medium of claim 13, the duration being specified by a start time and end time.

15. The at least one tangible non-transitory machine-readable medium of claim 13, further comprising instructions configurable to cause the processor to associate a resource type with the policy configuration.

16. The at least one tangible non-transitory machine-readable medium of claim 13, further comprising instructions configurable to cause the processor to authorize access by the user to the cluster if the duration has not expired.

17. The at least one tangible non-transitory machine-readable medium of claim 13, further comprising instructions configurable to cause the processor to associate a group with the policy configuration; and assign the role to the group.

\* \* \* \* \*